3,250,824
PROCESS FOR THE PRODUCTION OF FLAME RESISTANT POLYESTER RESINS

Gunther Maahs, Helmut Wieschollek, Walter Gumlich, and Horst Kramer, Marl, Germany, assignors to Chemische Werke Huls Aktiengesellschaft, Marl, Kreis Recklinghausen, Germany, a corporation of Germany
No Drawing. Filed Dec. 2, 1963, Ser. No. 327,540
Claims priority, application Germany, May 7, 1963, C 29,870
4 Claims. (Cl. 260—869)

The object of the present invention is the provision of a process for the production of flame resistant synthetic plastics from unsaturated polyester resins.

It is known to harden mixtures of unsaturated linear polyesters and co-polymerizable ethylene derivatives, known as unsaturated polyester resins, with additions of polymerization initiators and if desired also accelerators to the production of insoluble synthetic resins.

The unsaturated polyesters are obtainable by the condensation of fumaric acid or maleic acid or their anhydrides with divalent alcohols such as ethylene glycol, diethylene glycol or 1,3-butanediol. A part of the unsaturated dicarboxylic acid can be substituted by a saturated dicarboxylic acid such as succinic acid, adipic acid, phthalic acid or their anhydrides. The polyesters can be modified by additions of mono or tri- or multi-valent carboxylic acids as well as by additions of mono-, tri- or multivalent alcohols. Styrene, vinylacetate, methacrylic acid ester and diallylphthalate suitably may be used as the co-polymerizable ethylene derivative. Suitable polymerization initiators are organic peroxides such as cumolhydroperoxide, methylethylketone peroxide and cyclohexanone peroxide, the action of which can be strengthened by accelerators such as cobalt octoate or cobalt naphthenate.

It has been found that flame resistant polyester synthetic plastics are produced by the hardening of mixtures of unsaturated polyesters with co-polymerizable ethylene derivatives containing additions of one or more compounds of the general formula

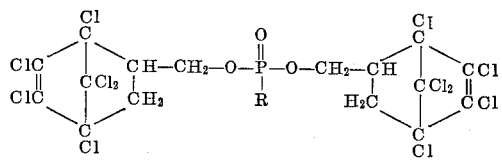

in which R stands for a member of the group consisting of alkyl, alkenyl and aryl groups which may be substituted or unsubstituted, in such amounts that the halogen contents of the mixtures is within the range from 8 to 25 percent by weight. Examples of values of R in the above formula are methyl, ethyl, propyl, butyl, chloromethyl, chloroethyl, dichloromethyl, trichloromethyl, tribromomethyl, vinyl, propenyl, butenyl, chlorobutenyl, phenylvinyl, phenyl, chlorophenyl, trichlorophenyl, bromophenyl and tribromophenyl groups.

Polyester synthetic plastics containing these compounds are even capable of extinguishing a flame by themselves.

A process for the production of compounds of the formula given above is disclosed in an application Serial No. 290,215 filed June 24, 1963, in the name of Günther Maahs and assigned to the assignee of the present application.

An example of said process is as follows 55.2 g. of 2-oxymethyl-1,4,5,6,7,7-hexachloro-bicyclo-[2,2,1]-heptene-(5) in the form of a 26% solution in methylcyclohexane and 13.2 g. of pyridine are put into a three-necked flask and 14 g. of chloromethylphosphonyl chloride dissolved in 50 ml. of methylcyclohexane is added dropwise while stirring and maintaining the temperature at 20° C. The reaction mixture is heated for 2 hours at 80° C., filtered from precipitated hydrochloride, decolorized with activated carbon and distilled under vacuum and heated to 110° C. at 4 Torr. The yield is 93.5% of a resin-like product the analysis of which agrees with the formula given above when R=CH$_2$Cl.

The production of flame resistant synthetic plastics of unsaturated polyester resins is known. An approved method is the use of the so called HET-acid, i.e., 1,4,5,6,7,7-hexachloro-bicyclo-[2,2,1]-5-heptene - 2,3 - dicarboxylic acid or its anhydride. This component is built into the polyester by esterification. However it is generally necessary to add phosphorus compounds in order to obtain the desired flame resistance. It is much simpler to produce flame resistant polyester synthetic plastic by mixing a suitable polyester resin with antimony trioxide and a halogen compound such as a halogenated paraffine and hardening the mixture. The range of utility of such polyester synthetic plastics is however limited due to the color of the antimony trioxide. It has therefore been proposed to introduce the antimony in the form of a soluble organic compound. It is also known to use halogen containing phosphoric acid esters, e.g., the trichloroethyl phosphate. One cannot however add enough of these phosphorus compounds to unsaturated polyester resins to attain the desired flame resistance without impairing the mechanical properties of the product. This disadvantage may be explained by the fact that the phosphoric acid esters are included in the resin merely as a plasticizer.

It was therefore surprising that by the use of the addition of the present invention to unsaturated polyester resins will yield self extinguishing products having outstanding transparency and valuable mechanical properties. Moreover as distinguished from the HET-acid treated resins the products of the present invention are water proof or highly water resistant.

The resins can be used for all purposes in which flame resistance and transparency are desired.

Example.—Production of a polyester 1160 g. of fumaric acid, 1480 g. of phthalic acid anhydride, 1630 g. of 1,2-propylene glycol and 750 mg. of hydroquinone are heated in a vessel equipped with a stirrer and a descending cooler under an atmosphere of nitrogen to 150–180° C. until the acid number reaches 38. After cooling the reaction product to 120° C. 1604 g. of styrene is stirred in.

1500 g. of the resulting polyester resin are mixed with 490 g. of chloromethyl-bis-(1,4,5,6,7,7-hexachloro-2-methylene-bi-cyclo [2,2,1] heptene-5)-phosphonate. 2 cc. of a 20% cobalt naphthenate and 4 cc. of 50% cyclohexanone peroxide are added to 100 g. of the mixture. Three glass mats are wetted with the resulting catalyzed resin, piled and rolled to a plate between sheets of cellophane. After hardening for one hour at room temperature the plate is further hardened for 2 hours at 80° C. and then cut into strips 2 cm. wide. The strips are held for 30 seconds at an angle of 45° in a non-luminous Bunsen flame about 4 cm. high. The strips extinguished instantly upon removal from the flame and had no afterglow.

We claim:

1. Process for the production of a flame resistant polyester synthetic plastic which comprises hardening a mixture of an unsaturated polyester, a co-polymerizable ethylene derivative and a compound of the general formula

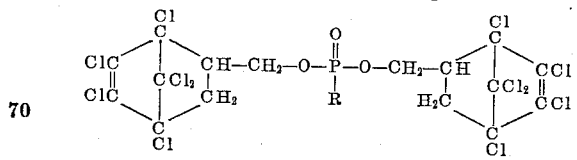

in which R stands for a member of the group consisting of substituted and unsubstituted alkyl, alkenyl and aryl groups containing from 1 to 8 carbon atoms, said compound of said formula being present in the mixture in quantity sufficient to provide from 8 to 25% by weight of halogen in the mixture.

2. Process as defined in claim 1 in which said compound of said formula is chloromethyl-bis-(1,4,5,6,7,7-hexachloro-2-methylene-bi-cyclo [2,2,1] heptene-5)-phosphonate.

3. A flame resistant polyester synthetic plastic made by the method defined in claim 1.

4. A flame resistant polyester synthetic plastic made by the method defined in claim 2.

No references cited.

MURRAY TILLMAN, *Primary Examiner.*

J. T. GOOLKASIAN, *Assistant Examiner.*